(12) United States Patent
Jaker et al.

(10) Patent No.: US 12,443,162 B2
(45) Date of Patent: Oct. 14, 2025

(54) SIMPLIFIED TUNING OF 3D PRINTERS

(71) Applicant: Stratasys, Inc., Eden Prairie, MN (US)

(72) Inventors: Vittorio Lorenzo Jaker, Chanhassen, MN (US); Joel Fortgang, Minneapolis, MN (US); Timothy James Riley, Savage, MN (US)

(73) Assignee: Stratasys, Inc., Eden Prairie, MN (US)

( * ) Notice: Subject to any disclaimer, the term of this patent is extended or adjusted under 35 U.S.C. 154(b) by 383 days.

(21) Appl. No.: 17/197,609

(22) Filed: Mar. 10, 2021

(65) Prior Publication Data

US 2022/0291663 A1   Sep. 15, 2022

(51) Int. Cl.
    *G05B 19/4093* (2006.01)
    *B33Y 50/00* (2015.01)

(52) U.S. Cl.
    CPC ........ *G05B 19/40931* (2013.01); *B33Y 50/00* (2014.12); *G05B 2219/49023* (2013.01)

(58) Field of Classification Search
    CPC .... G05B 19/40931; G05B 2219/49023; B33Y 50/00
    See application file for complete search history.

(56) References Cited

U.S. PATENT DOCUMENTS

| | | |
|---|---|---|
| 6,547,995 B1 | 4/2003 | Comb |
| 6,814,907 B1 | 11/2004 | Comb |
| 10,654,220 B2 | 5/2020 | Iorio et al. |
| 10,846,808 B1 * | 11/2020 | Posillico ............ G06Q 20/3678 |
| 10,878,136 B2 | 12/2020 | Abunojaim et al. |
| 2019/0278878 A1 * | 9/2019 | Sawyer ................. G06F 21/602 |
| 2020/0139631 A1 * | 5/2020 | Buller ................... B29C 64/386 |

(Continued)

FOREIGN PATENT DOCUMENTS

| | | |
|---|---|---|
| DE | 102012111556 A1 | 6/2014 |
| WO | 2021016666 A1 | 2/2021 |

OTHER PUBLICATIONS

PCT Notification of Transmittal of Search Report and the Written Opinion of the International Searching Authority, or the Declaration dated Oct. 30, 2023 for corresponding PCT application Serial No. PCT/US2023/071996, 17 pages.

*Primary Examiner* — Robert E Fennema
*Assistant Examiner* — Yvonne Trang Follansbee
(74) *Attorney, Agent, or Firm* — Theodore M. Magee; Westman, Champlin & Koehler, P.A.

(57) ABSTRACT

A 3D printer includes a holding area holding material to be used to produce a part and at least one component for producing the part through layer-wise additive manufacturing. A data storage device in the 3D printer stores instructions for generating build parameter values, the instructions including empirically derived data, relationships, and/or equations. A processor in the 3D printer receives values for a public build parameter set and a category for the material wherein the category represents multiple different materials. The processor executes instructions to determine values for a private build parameter set that vary based on the properties of the material. The values for the private build parameter set are determined from the received values for the public build parameter set and the received category. The processor then uses the received values for the public build parameter set and the values for the private build parameter set to build the part.

22 Claims, 5 Drawing Sheets

(56) References Cited

U.S. PATENT DOCUMENTS

| | | |
|---|---|---|
| 2021/0086451 A1* | 3/2021 | Carbone ................ B33Y 80/00 |
| 2021/0247325 A1 | 8/2021 | Ong et al. |
| 2022/0193915 A1 | 6/2022 | Marinkovich et al. |
| 2022/0274339 A1* | 9/2022 | Gonzalez Rogel ..... G06F 21/84 |

* cited by examiner

SIMPLIFIED TUNING OF 3D PRINTERS

BACKGROUND 3D printers build three-dimensional parts layer-by-layer from one or more part materials. Materials engineers work to identify new materials that can be used in 3D printers. When developing such materials, the engineers are concerned with many properties of the material including the uniformity of heating and cooling of the material; volatiles in the material; the viscosity of the material when it is melted; the mechanical properties of the material within the part; the density of the material in the part; the orientation of fibers in the part; movement of the material through the 3D printer; shrinkage, creep, warp and curl of the part; self-adhesion of the material; adhesion to support materials used during the part build; color of the part; finish of the part; and cost, for example.

SUMMARY

A 3D printer includes a holding area holding material to be used to produce a part and at least one component for producing the part through layer-wise additive manufacturing. A data storage device in the 3D printer stores instructions for generating build parameter values, the instructions including empirically derived data, relationships, and/or equations. A processor in the 3D printer receives values for a set of build parameters and a category for the material wherein the category represents multiple different materials. The processor executes instructions to determine values for a set of additional build parameters that vary based on the properties of the material. The values for the additional build parameters are determined from the received build parameter values and the received category. The processor then uses the received build parameter values and the set of additional build parameter values to build the part.

In accordance with a further embodiment, a method in a 3D printer is provided. The method includes receiving values for a public build parameter set and receiving a category for the material wherein the category represents multiple different materials. Values for a private build parameter set that vary based on the properties of the material are determined from the received public build parameter set values and the received category. The received public build parameter set values and the private build parameter set values are used to build a part.

In accordance with a still further embodiment, a method performed by a 3D printer is provided that includes receiving a value for a first parameter from a user of the additive manufacturing machine and receiving a category for a material used by the 3D printer. A value for a second parameter is determined based on the category and the value for the first parameter. The value for the second parameter and the identity of the second parameter are stored such that the user of the manufacturing machine cannot access the value for the second parameter or the identity of the second parameter. A part is built using the value for the first parameter and the value for the second parameter.

In accordance with a still further embodiment, a 3D printer includes a holding area holding material to be used to produce a part and at least one component for producing the part through layer-wise additive manufacturing. A data storage device in the 3D printer stores instructions for generating build parameter values, the instructions including empirically derived data, relationships, and/or equations. A processor in the 3D printer receives values for a set of build parameters that vary based on at least one of properties of the material, liquefier hardware, and slice height and receives a category for the material wherein the category represents multiple different materials. The processor executes the instructions for generating the build parameter values to determine values for a set of additional build parameters that vary based on the properties of the material, wherein the values for the additional build parameters are determined from the received build parameter values and the received category. The processor uses the received build parameter values and the set of additional build parameter values to build the part.

Figure 1:
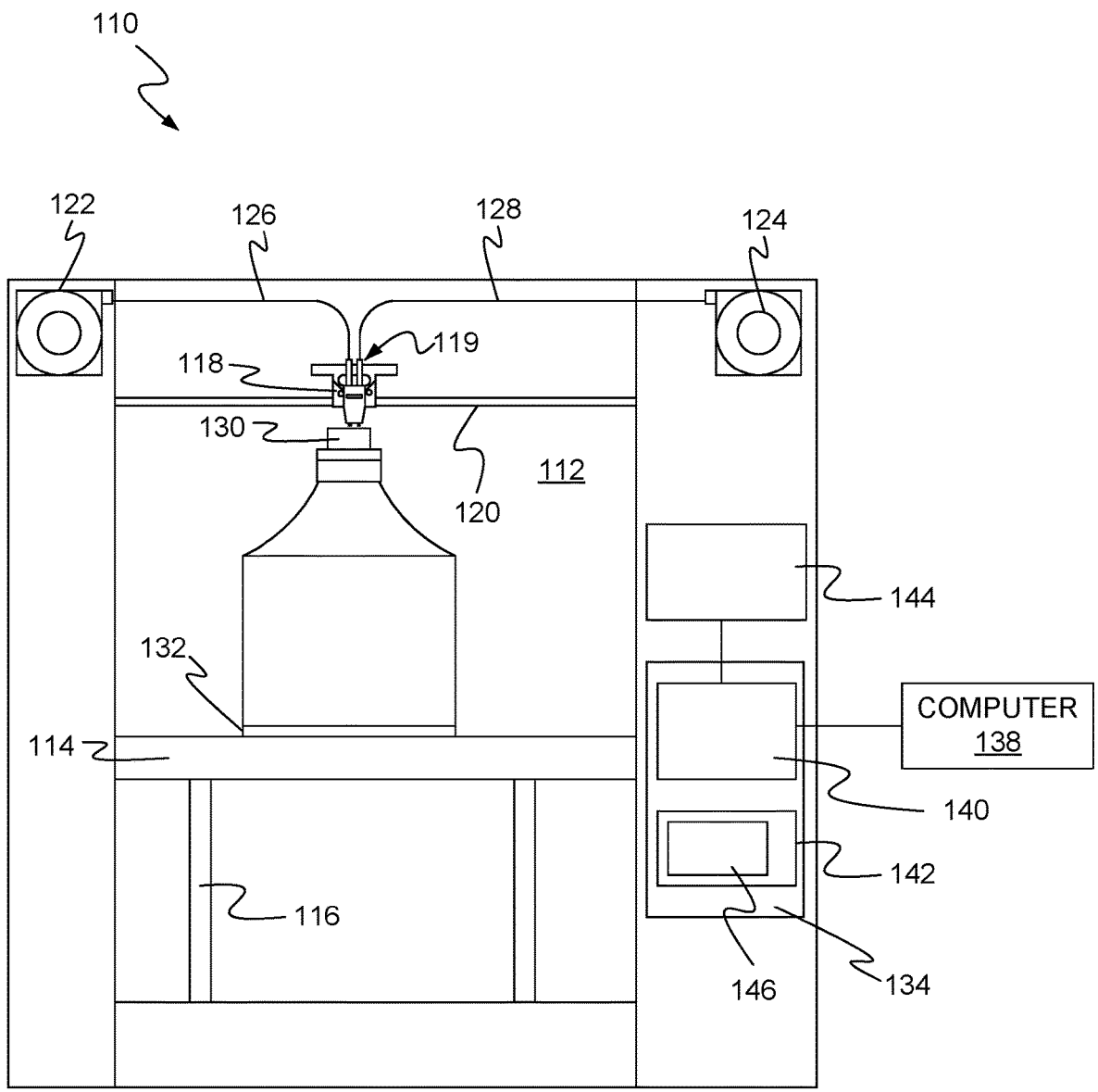
FIG. 1 is a schematic diagram of an exemplary 3D printer in which embodiments are practiced.

DETAILED DESCRIPTION 3D printers are complex machines having multiple electrical, mechanical and thermal components that cooperate to build parts. Various 3D printing technologies are available, and each are used to translate digital files into physical objects by adding successive layers of material. All printer technologies are limited to some extent in terms of the kinds of material that can be processed and printed using the technology, but many 3D printers can be used with a range of different part materials and support materials. Some systems are tightly-engineered, such that the hardware and software are designed for use with specific formulations of materials, while other systems have higher tolerances and accept a wider variety of materials.

Typically, when a part material or support material is changed in a 3D printer, build parameters used to control the components of the printer need to be modified to accommodate the material properties of a selected material, or should ideally be changed to values that work best for the selected material. Consistently and predictively printing high-quality parts requires integration of the materials, software and hardware, and "tuning" of printer parameters to match the material properties and printing conditions. In short, the operating system software must be modified to accommodate the materials.

Identifying the best build parameters for a material is a time-consuming and complex process which often requires iteratively building test parts using different combinations of build parameters until the best combination of build parameters is identified. The material tuning is typically performed by skilled engineers and materials developers relying on their experience and know-how. Many of the necessary software modifications in high-performance industrial 3D printers require software access and code modifications that are not made available to the end users or printer owners, and thus can be made only by the printer manufacturer.

As a result, such printer operators find it difficult if not impossible to set the myriad build parameters of the 3D printer when attempting to test or run a new material.

Embodiments described below simplify the process of tuning build parameters for a 3D printer by requiring a user to only enter a category for the part material and/or support material and values for a small subset of the build parameters. Using this limited amount of information from the user, intelligence built into the 3D printer determines all the other build parameters for the components of the printer. This greatly simplifies the tuning process.

3D printers include several manufacturing technologies that build parts layer-by-layer. Each vary in the way they form plastic and metal parts and can differ in material selection, surface finish, durability, and manufacturing speed and cost. 3D printer technologies include but are not limited to:

Material extrusion—an additive manufacturing process in which material is selectively dispensed through a nozzle or orifice (also known as fused deposition modeling);

Material jetting—an additive manufacturing process in which droplets of build material are selectively deposited (also known as ink jetting);

Binder jetting—an additive manufacturing process in which a liquid bonding agent is selectively deposited to join powder materials;

Vat photopolymerization—an additive manufacturing process in which liquid photopolymer in a vat is selectively cured by light-activated polymerization (includes stereolithography and digital light curing processes);

Powder bed fusion—an additive manufacturing process in which thermal energy selectively fuses regions of a powder bed (includes selective laser sintering, high-speed sintering, and direct metal laser sintering); and Directed energy deposition—an additive manufacturing process in which focused thermal energy is used to fuse materials by melting as they are being deposited FIG. 1 is a schematic front view of an exemplary additive manufacturing system 110 in which embodiments are practiced. As shown in FIG. 1, system 110 is a material extrusion additive manufacturing system for printing or otherwise building 3D parts and support structures using a layer-based, additive manufacturing technique, where the 3D part can be printed from part material and support structures can be printed from support material. Suitable extrusion-based additive manufacturing systems for system 110 include fused deposition modeling systems developed by Stratasys, Inc., Eden Prairie, MN under the trademark "FDM".

In the illustrated embodiment, system 110 includes chamber 112, platen 114, platen gantry 116, an extrusion head or print head 118, head gantry 120, and consumable assemblies 122 and 124. Chamber 112 is an enclosed environment that contains platen 114 and any printed parts. Chamber 112 can be heated (e.g., with circulating heated air) to reduce the rate at which the part and support materials solidify after being extruded and deposited.

Platen 114 is a platform on which printed parts and support structures are printed in a layer-by-layer manner. In some embodiments, platen 114 may also include a removable substrate on which the printed parts and support structures are printed. In the illustrated example, print head 118 is a dual-tip extrusion head configured to receive consumable filaments from consumable assemblies 122 and 124 (e.g., via feed tube assemblies 126 and 128) for printing 3D part 130 and support structure 132 on platen 114. Consumable assembly 122 may contain a supply of a part material filament, such as a high-performance part material, for printing printed part 130 from the part material. Consumable assembly 124 may contain a supply of a support material filament for printing support structure 132 from the given support material. Consumable assemblies 122 and 124 constitute holding areas for holding filament materials to be used to print parts.

Platen 114 is supported by platen gantry 116, which is a gantry assembly configured to move platen 114 along (or substantially along) a vertical z-axis. Correspondingly, print head 118 is supported by head gantry 120, which is a gantry assembly configured to move print head 118 in (or substantially in) a horizontal x-y plane above chamber 112. In an alternative embodiment, platen 114 may be configured to move in the horizontal x-y plane within chamber 112 and print head 118 may be configured to move along the z-axis. Other similar arrangements may also be used such that one or both of platen 114 and print head 118 are moveable relative to each other over a desired number of degrees of freedom. Platen 114 and print head 118 may also be oriented along different axes. For example, platen 114 may be oriented vertically and print head 118 may print printed part 130 and support structure 132 along the x-axis or the y-axis.

The print head 118 can have any suitable configuration. In one example, the print head 118 includes a filament drive mechanism 119, a heated-tube liquefier, and an extrusion nozzle. The liquefier includes an inlet which often is cooled to prevent melting of the filament as it enters the liquefier and a heated melt region, which may include one or more heating zones, where the filament melts to form a molten pool. The filament drive mechanism 119 engages the filament and feeds the filament into the liquefier at a controlled rate. The unmelted portion of the filament essentially fills the inlet of the liquefier tube, providing a plug-flow type pumping action to extrude the molten filament material from the extrusion nozzle to form a continuous flow or toolpath of resin material. During a build operation, one or more drive mechanisms, such as filament drive mechanism 119 and a filament loading drive, are directed to intermittently feed the part and support materials (e.g., consumable filaments via feed tube assemblies 126 and 128) through the printer to print head 118 from supply sources 122 and 124, and into the liquefier. The extrusion rate is unthrottled and is based only on the feed rate of filament into the liquefier, and the feed rate is calculated to achieve a targeted extrusion rate for the part build. The print head is moved along toolpaths at a controlled rate matched to the extrusion rate, as the extruded flow of material is deposited as beads of material to form cross-sections of the part (typically, in planar layers, but toolpaths can be multi-axis). The deposited material fuses to previously deposited material, and solidifies upon a drop in temperature.

System 110 also includes controller 134, which can include one or more control circuits configured to monitor and operate the components of system 110. For example, controller 134 can control one or more heating units for chamber 112, one or more heaters in print head 118, the motors of gantries 120 and 116, drive mechanism 119 and the filament loading drive. In addition, controller 134 receives sensor signals from various sensors and calibration devices in system 110, including temperature sensors. Controller 134 includes a processor 140 and a data storage 142, which stores instructions executed by processor 140, empirically derived data, relationships and equations 146, user-provided categories for the materials in supply sources 122 and 124, and user-provided build parameter values. Controller 134 is connected to a user interface 144 to provide text and images on user interface 144 and to receive information from a user through user interface 144. In accordance with one embodiment, user interface 144 is a touch screen. Controller 134 also communicates with a computer 138, which can include one or more discrete computer-based systems that communicate with system 110 and/or controller 134, and may be separate from system 110, or alternatively may be an internal component of system 110. Computer 138 includes computer-based hardware, such as data storage devices, processors, memory modules, and the like for generating and storing tool path and related printing instructions. Computer 138 may transmit these instructions to system 110 (e.g., to controller 134) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 138. The computer 138 can communicate with controller 134, which serves to direct the system 110 to print the 3D part 130 and optionally, a support structure 132. Part material is deposited in layers along toolpaths that build upon one another to form the 3D part 130. Layer thickness or "slice height" used in the printing process will determine the feature detail and surface finish of a printed part.

Figure 2:
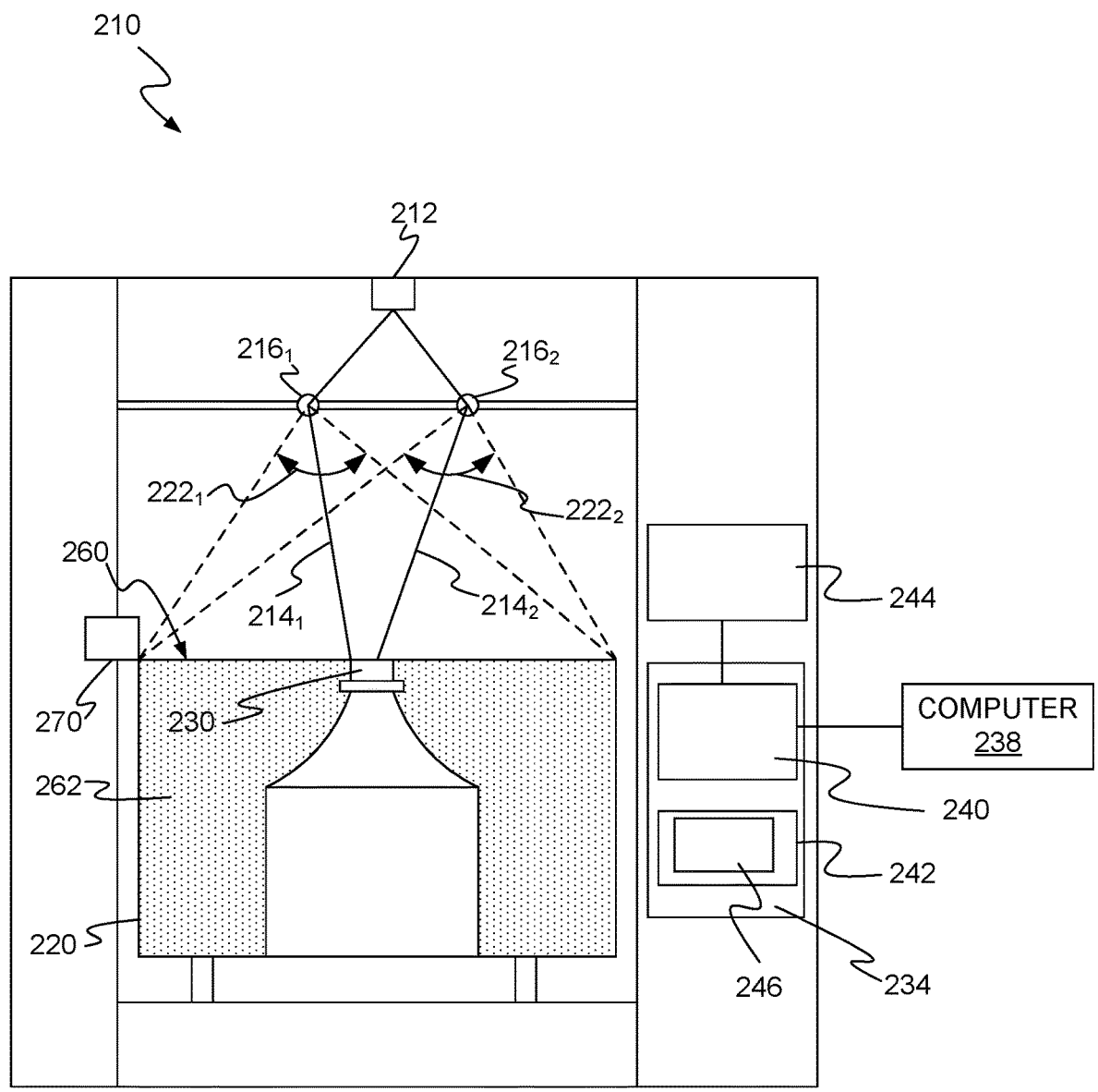
FIG. 2 is a schematic diagram of a second exemplary 3D printer in which embodiments are practiced.

FIG. 2 provides a schematic diagram of a second exemplary additive manufacturing system 210 in which vat photopolymerization technology embodiments are practiced. Additive manufacturing system 210 constructs parts using stereolithography 3D printing. In general, to print parts using stereolithography, a thin layer of a liquid photopolymer material is coated evenly across a vat and a laser scanner control mechanism is operated to move one or more laser beams and to modulate the energy level per unit area of the laser beams to selectively cure a pattern in the photopolymer layer coated in the vat. When one layer is complete, another layer of liquid photopolymer is coated over the previous layer, and the next layer is scanned. This process is repeated until the part is built. In accordance with some embodiments, to keep the top layer of photopolymer the same distance from the laser, the entire vat is moved downward relative to the laser each time a layer is recoated in the vat.

As illustrated in FIG. 2, system 210 includes a laser source 212 that produces one or more laser beams $214_1$, $214_2$. The system 210 further includes one or more scanners $216_1$, $216_2$ where scanner $216_1$ is configured to direct laser beam $214_1$ of the plurality of laser beams onto a top layer 260 of liquid photopolymer material 262 in vat 220, and scanner $216_2$ is configured to direct a laser beam $214_2$ of the plurality of laser beams onto top layer 260 of liquid photopolymer material 262 in vat 220. Laser source 212 may be a single laser emitter and a corresponding optical system configured to split a first laser beam into a plurality of second laser beams for processing. Alternatively, the laser source 212 may comprise a plurality of laser emitters, each configured to concurrently emit a single laser beam. The laser beams $214_1$, $214_2$ are directed from the laser source 212 to the respective scanner $216_1$, $216_2$. Each scanner $216_1$, $216_2$ is configured to direct an incident laser beam $214_1$, $214_2$ within a scan area (indicated by angle $222_1$, $222_2$) on top layer 260 of liquid photopolymer 262 in vat 220. Each of the scan areas generally corresponds to and covers at least a portion of top layer 260. The laser energy of each incident laser beam $214_1$, $214_2$ transfers to top layer 260 causing the liquid photopolymer material to cure. After the top layer 260 is cured, a recoater blade 270 traverses the build area to coat a next layer of liquid photopolymer material 262 across the vat 220.

System 210 also includes controller 234, which can include one or more control circuits configured to monitor and operate the components of system 210. For example, controller 234 can control a heating unit for a chamber that houses vat 220, the intensity of the laser generated by laser emitter 212, the focusing of the laser beams, and the rate of scanning of scanners $216_1$, $216_2$, for example. In addition, controller 234 receives sensor signals from various sensors and calibration devices in system 210. Controller 234 includes a processor 240 and a data storage 242, which stores instructions executed by processor 240, empirically derived data, relationships, and equations 246, a user-provided category for material 262, and user-provided build parameter values. Controller 234 is connected to a user interface 244 to provide text and images on user interface 244 and to receive information from a user through user interface 244. In accordance with one embodiment, user interface 244 is a touch screen. Controller 234 also communicates with a computer 238, which can include one or more discrete computer-based systems that communicate with system 210 and/or controller 234, and may be separate from system 210, or alternatively may be an internal component of system 210. Computer 238 includes computer-based hardware, such as data storage devices, processors, memory modules, and the like for generating and storing tool path and related printing instructions. Computer 238 may transmit these instructions to system 210 (e.g., to controller 234) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 238. The computer 238 can communicate with controller 234, which serves to direct the system 210 to print the 3D part 230.

Figure 3:
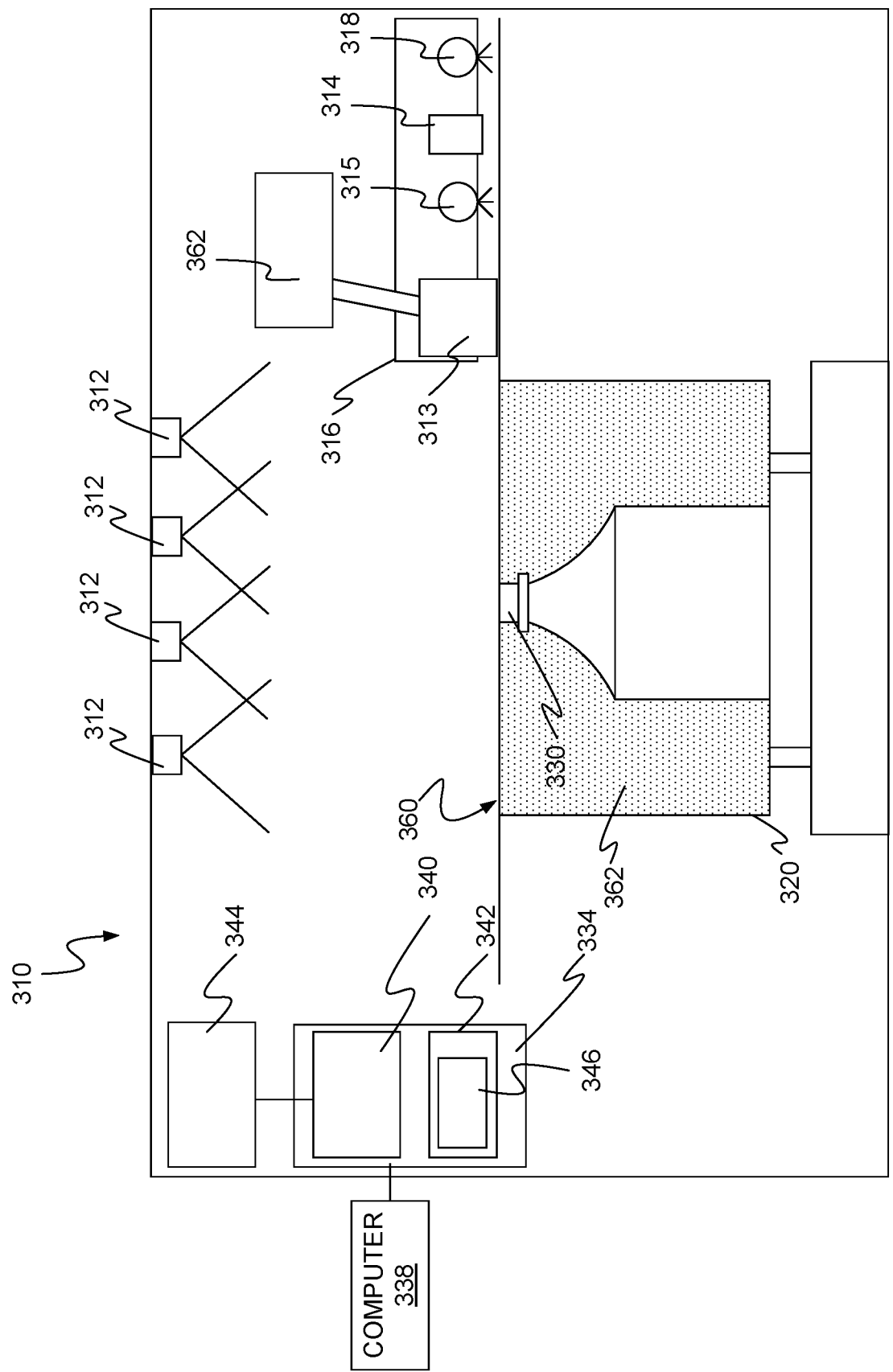
FIG. 3 provides a schematic diagram of a third exemplary 3D printer in which embodiments are practiced.

FIG. 3 provides a schematic diagram of a third exemplary additive manufacturing system 310 in which embodiments are practiced. Additive manufacturing system 310 constructs parts using high speed sintering. In general, to print a part using high speed sintering, a thin layer of powder material is first dispensed evenly in a part bed by a powder recoater (for instance, a counter-rotating roller or a blade) traveling over the part bed. An inkjet print head then images a part layer by spraying radiation-absorbing ink onto selected portions of the powder material. The part bed is then exposed to radiation, for example infrared radiation provided by a sintering lamp that traverses the part bed, wherein the radiation is absorbed more by the portions imaged by the absorber than by the pure powder material thereby causing the imaged portions to heat faster than the unprinted powder. When the imaged portions are sufficiently heated, they sinter while the unprinted powder remains loose. After sintering, the part bed is lowered by one layer thickness. This process is repeated until the assembly of a part is completed.

As illustrated in FIG. 3, system 310 includes a powder recoater 313 configured to distribute a layer of a powder material 362 onto a part bed 320, and overhead radiation sources 312 that emit light toward part bed 320 to pre-heat the powder. Optionally, a preheating lamp 315 carried by a sled 316 is used to further pre-heat the powder by traversing the part bed 320. A print head 314 is moved on the sled 316 (or on a separate sled) over top surface 360 of powder material 362. As it is moved, print head 314 sprays radiation-absorbing ink to print an image of one layer of the part. Once the image is printed, sintering lamp 318 is moved on sled 316 (or on a separate sled) over the part bed 320, and the radiation from sintering lamp 318 causes the imaged powder to sinter and form a part layer. Radiation sources 312 and the sintering lamp 318 may comprise halogen lamps, either modular or a full width single bulb; arrays of infrared radiation (IR) lamps, arrays of light-emitting diodes (LEDs); ceramic lamps; or any other suitable radiation emitter. The wavelength of the light emitted by the sintering lamp 318 is selected to be readily absorbed by the absorber while not being readily absorbed by the powder material.

System 310 also includes controller 334, which can include one or more control circuits configured to monitor and operate the components of system 310. For example, controller 334 can control a heating unit for a chamber the houses part bed 320, the intensity of radiation sources 312, the speed and acceleration of the sled(s) 316 carrying the powder recoater, the print head 314, the pre-heat lamp, and the sintering lamp 318, the amount of time between printing the ink and dispensing a new layer of powder material, and the thickness of the powder material for each layer. In addition, controller 334 receives sensor signals from various sensors and calibration devices in system 310. Controller 334 includes a processor 340 and a data storage 342, which stores instructions executed by processor 340, empirically derived data, relationships, and equations 346, a user-provided category for material 362, and user-provided build parameter values. Controller 334 is connected to a user interface 344 to provide text and images on user interface 344 and to receive information from a user through user interface 344. In accordance with one embodiment, user interface 344 is a touch screen. Controller 334 also communicates with a computer 338, which can include one or more discrete computer-based systems that communicate with system 310 and/or controller 334, and may be separate from system 310, or alternatively may be an internal component of system 310. Computer 338 includes computer-based hardware, such as data storage devices, processors, memory modules, and the like for generating and storing tool path and related printing instructions. Computer 338 may transmit these instructions to system 310 (e.g., to controller 334) to perform printing operations.

A digital model representative of a 3D part to be printed can be created, such as by scanning an existing 3D object to create a digital image file, or such as by drawing a 3D model using a computer-aided design (CAD) program. The digital model and/or instructions for printing the model can be loaded into computer 338. The computer 338 can communicate with controller 334, which serves to direct the system 310 to print the 3D part 330.

Although three additive manufacturing systems are discussed above so as to provide examples of environments in which the present embodiments can be practiced, those skilled in the art will recognize that the embodiments may be practiced in other 3D printers and the embodiments are not limited to the 3D printers shown in FIGS. 1-3.

Figure 4:
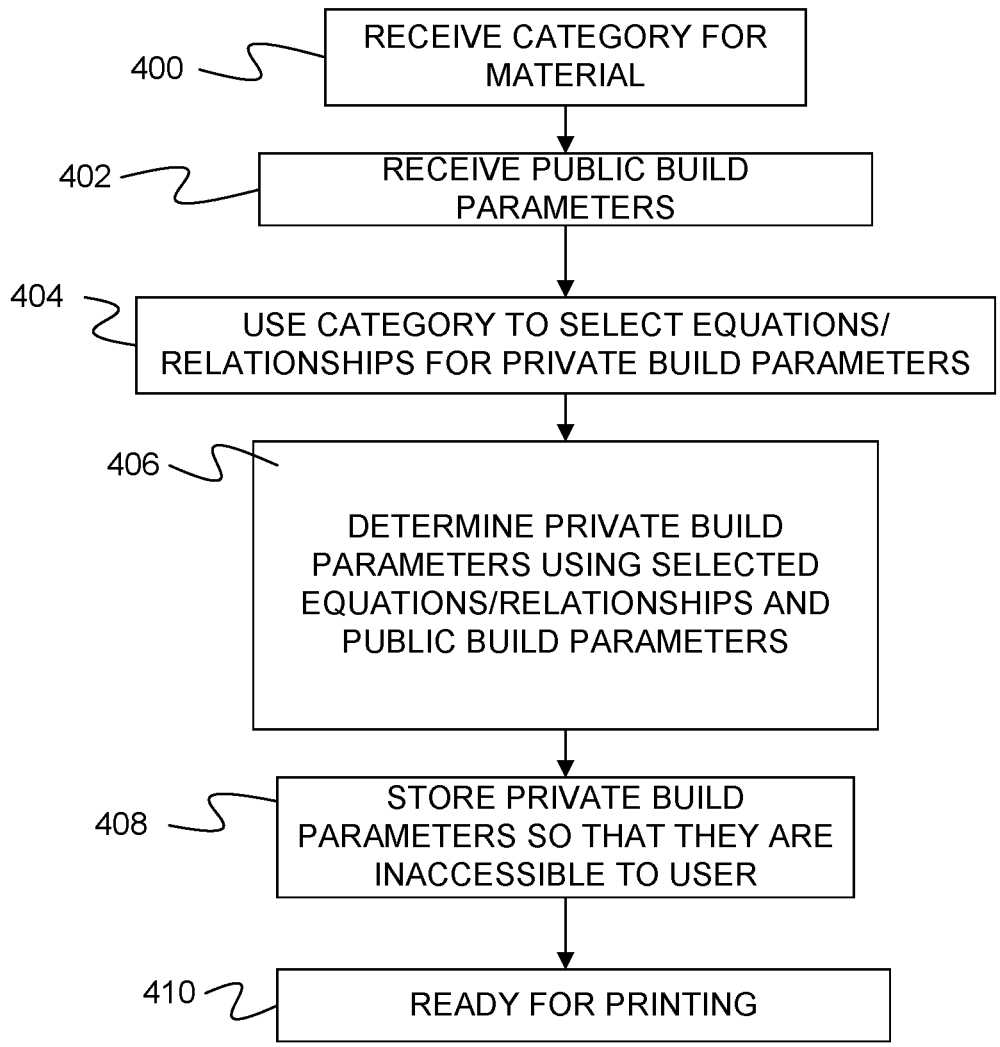
FIG. 4 is a flow diagram of a method of securely setting private build parameters in accordance with one embodiment.

FIG. 4 provides a method of setting build parameters in a 3D printer in accordance with one embodiment. In step 400, the controller of the 3D printer receives a category for a material that is to be used to build a part. This category can be a category for a part material, a support material or a combination of a part material and a support material. The category is selected from a plurality of possible categories with each possible category capable of representing multiple different materials. Thus, the category is not an identifier for a single material but instead encompasses a number of different materials. For example, in one embodiment, the categories comprise Standard Plastics, Engineering Plastics, and High-Performance plastics. The category can be received through the user interface of the printer or may be sent by a computer in communication with the printer's controller.

At step 402, the printer's controller receives a set of public build parameters. This set is a subset of all the build parameters used by the printer to control the printer's components. For a material extrusion system, one example of a set of public build parameters is Head Speed, Chamber Temperature, Extruder Temperature, Bead Volume, Seam Start, and Seam End. In accordance with one embodiment, the values of the public build parameters vary with the properties of the material. The public build parameters may include material properties relevant to the 3D printing process, such as for example glass transition temperature, melting point, heat deflection temperature, heat capacity, melt flow, coefficient of thermal expansion, thermal conductivity, viscosity, density, tensile strength, flexural modulus, shrink factors, and/or molecular weight; and may also include particle size and size distribution for powders, and cross-sectional profiles for filament materials. In other embodiments, at least one of the public build parameters has a value that is independent of the material's properties. Additional public build parameters include layer height and hardware specifications such as a configuration or diameter of the print nozzle being used by the 3D printer. The public build parameters can be received through the user interface of the printer or may be sent by a computer in communication with the printer's controller. The number of public build parameters received at step 402 is much smaller than the total number of build parameters used by the 3D printer's controller to control the components of the 3D printer.

At step 404, the processor of the controller in the printer uses the received category to retrieve data, relationships and equations from the data storage of the controller that can be used to determine private build parameters from the public build parameters that are provided in step 402. For example, in the embodiment of FIG. 1, processor 140 retrieves data, relationships and equations 146 from data storage 142; in the embodiment of FIG. 2, processor 240 retrieves data, relationships and equations 246 from data storage 242 and in the embodiment of FIG. 3, processor 340 retrieves data, relationships and equations 346 form data storage 342. The data, equations and relationships includes equations and relationships that have been empirically-derived by technology experts in 3D printing (typically, the printer manufacturer) based on insights, know-how and expertise gained from extensive use the printer and observation and evaluation of its output. In accordance with one embodiment, each category has its own set of equations/relationships for determining the private build parameters from the public build parameters. As a result, the private build parameters determined for one category of material can be different from the private build parameters determined for another category of material when the same public build parameters are received for both categories. This allows the private build parameters to be more accurately determined for a material even when the exact properties of the material are unknown.

At step 406, the values of the public build parameters are applied to the selected equations/relationships to determine the values of the private build parameters. The public build parameters and the equations/relationships can be used to determine any desired private build parameter, however, in most embodiments, the public build parameters and the equations/relationships are used to determine private build parameters that vary with a property of the materials used to build the part.

Private build parameters for a material extrusion 3D printer are selected from categories such as extrusion volume/density variation and flow control; print head motion-related parameters, including print head velocities, accelerations and jerk calculations; print head movement functionality; closed-loop and feed-forward control factors for time-based control; calibration conditions; and liquefier control parameters such as are taught by Stratasys, Inc. in U.S. Pat. Nos. 6,547,995 and 6,814,907. Private build parameters for a stereolithography 3D printer are selected from categories such as layer exposure time, programmed delay and movement parameters, laser power/scan control factors, material feed/flow parameters/pumping, environmental temp control factors, optical calibration factors, build platform gains and controls, and recoater speed parameters.

Private build parameters for high-speed sintering printers are selected from categories such as sled speeds, application controls for layer thickness and density, thermal heating and cooling control strategies (for both the powder bed and ambient environment), absorber application control with respect to viscosity, temperature and droplet size, radiation source energy management with respect to both duty cycle and power level, and powder distribution thermal control settings.

The distinction between public build parameters and private build parameters is that the derivation and values of the private build parameters are not disclosed to the public. The values of the private parameters and the equations used to derive them are a result of insights, know-how and expertise of the printer manufacturer in the printer control category. The values for the private build parameters and the relationships between the private build parameters and other build parameters may be considered trade secrets of the 3D printer's manufacturer. The private parameters, while remaining publicly inaccessible, provide the intelligence to enable end users and operators to print new materials.

As such, the private build parameters determined in step 406 are not disclosed to the user. In fact, at step 408, the determined private build parameters are stored so that they are inaccessible to the user of the 3D printer but can be used by the printer's controller to print parts. Storing the private build parameters in this fashion preserves the trade secrets of the printer's manufacturer including the types of parameters that are set in the printer and the relationships between the various build parameters.

Once the public and private build parameters have been set in the printer, the printer is ready for printing at step 410.

Figure 5:
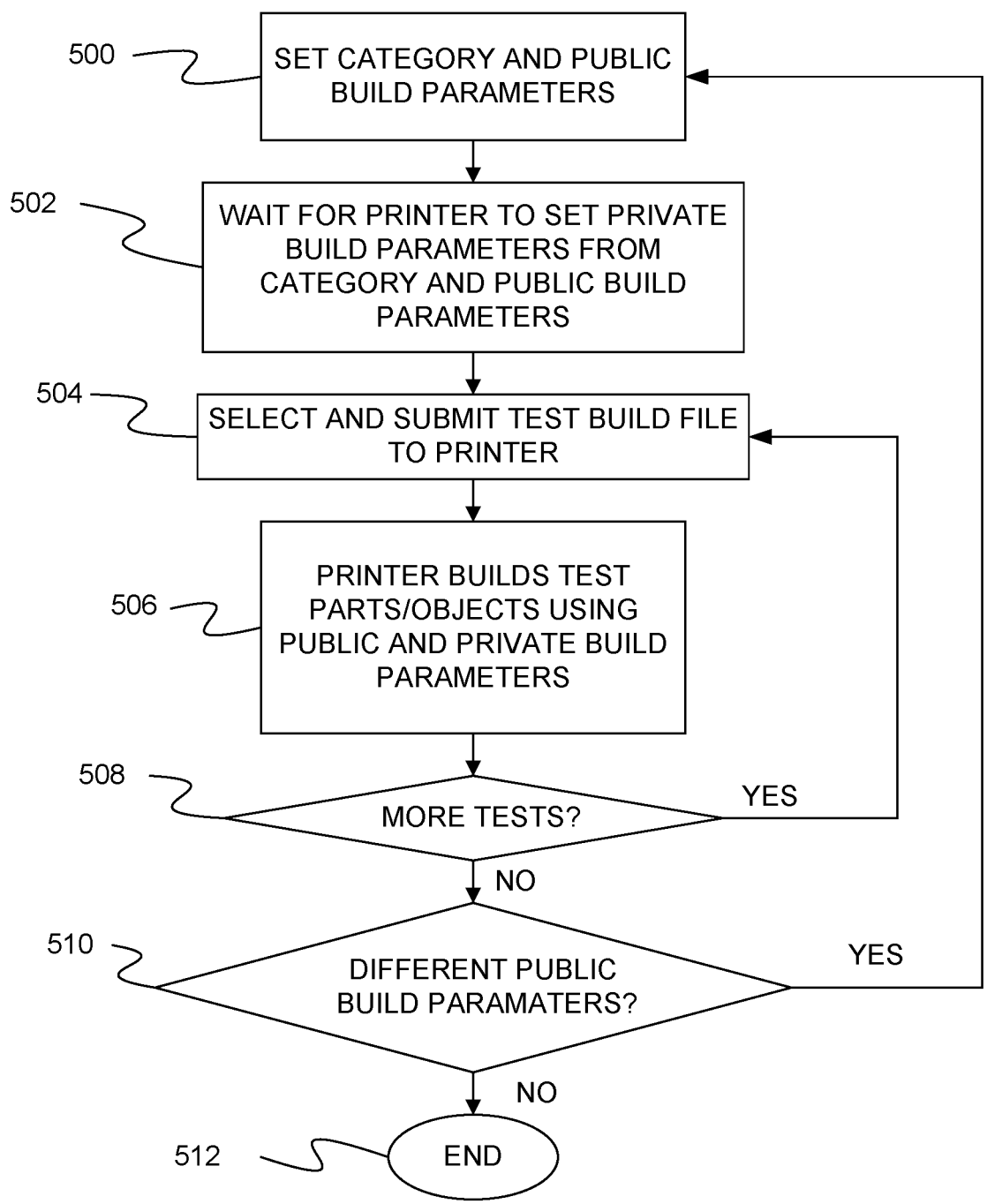
FIG. 5 is a flow diagram of a method of testing a new material in accordance with one embodiment.

FIG. 5 provides a flow diagram of a method of evaluating a new material. In step 500, a category for the material and values for public build parameters are set. The category can be a category for a part material, a support material or a combination of a part material and a support material. The category is selected from a plurality of possible categories with each possible category capable of representing multiple different materials. Thus, the category is not an identifier for a single material but instead encompasses a number of different materials. For example, in one embodiment, the categories comprise Standard Plastics, Engineering Plastics, and High-Performance plastics. The category can be set through the user interface of the printer or may be set through a computer in communication with the printer's controller. The public parameters are a subset of all the build parameters used by the printer to control the printer's components. One example of a set of public build parameters is Head Speed, Chamber Temperature, Extruder Temperature, Bead Volume, Seam Start, and Seam End for a fused deposition modeling printer. In accordance with one embodiment, the values of the public build parameters vary with the properties of the material. In other embodiments, at least one of the public build parameters has a value that is independent of the material's properties. Additional public build parameters include individual layer height preferences, and hardware specifications such as a type or diameter of the print nozzle. The public build parameters can be set through the user interface of the printer or may be set through a computer in communication with the printer's controller.

At step 502, the printer's controller sets private build parameters based on the selected category and the public build parameters. In accordance with one embodiment, the printer sets the private build parameters by applying the public build parameters to equations/relationships that are designated for the selected category. The determined private build parameters are stored so that they are inaccessible to the user of the 3D printer but can be used by the printer's controller to print parts. Storing the private build parameters in this fashion preserves the trade secrets of the printer's manufacturer including the types of parameters that are set in the printer and the relationships between the various build parameters.

At step 504, a test build file is selected and sent to the printer. The test build file provides instructions for building one or more parts that can be used to evaluate the performance of the material. Examples include parts/objects that can be used to test bead size, seams, self-adhesion, part density, support adhesion, curl verification, and other part properties. At step 506, the printer prints the parts in the test build file and a tester evaluates the parts.

At step 508, the tester determines if another test should be performed. If another test is to be performed, the process returns to step 504 to select a different test build file. A variety of test part geometries may also be tested and/or selected, in order to generate more data on which to assess build quality and acceptability. When all of the desired tests have been performed at step 508, the tester determines if other public build parameters should be used to evaluate the material at step 510. For example, if the test objects are not satisfactory, the tester may wish to change one or more of the public build parameters to see if a satisfactory test object can be built with different build parameters. If different public build parameter values are to be tried, the process returns to step 500 where the new public build parameter values are set and steps 502-508 are repeated. In particular, the new public build parameter values are used to calculate new values for the private build parameters at step 502. When no other public build parameters are to be evaluated at step 510, the process of FIG. 5 ends at step 512.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A 3D printer comprising:
   a holding area holding material to be used by the 3D printer to produce a part;
   at least one component for printing the part through layer-wise additive manufacturing using a 3D printing technology;
   a data storage device on which instructions are stored for generating build parameter values, the instructions including empirically derived data, relationships, and/ or equations; and a processor executing instructions stored on the data storage device to perform steps comprising:
receiving values for a public build parameter set and receiving a category for the material wherein the category represents multiple different materials and wherein the material in the holding area is a material within the category;
based on the received category for the material and with at least one property of the material being unknown, selecting instructions for generating build parameter values wherein different instructions are selected for different received categories;
executing the selected instructions for generating the build parameter values to determine values for a private build parameter set that vary based on the properties of the material, wherein the values for the private build parameter set are determined from the received public build parameter set values and the parameters of the private build parameter set are different from the parameters of the public build parameter set used to determine the values for the private build parameter set; and
using the received public build parameter set values and the private build parameter set values to print the part from the material in the holding area using the at least one component.

2. The 3D printer of claim 1 wherein the processor performs a further step of storing the private build parameter set values in the data storage device such that user access to the private build parameter set values is prevented.

3. The 3D printer of claim 1 wherein the public build parameter set values and the private build parameter set values are used to build a plurality of parts.

4. The 3D printer of claim 1 wherein the processor executes additional instructions to perform further steps comprising:
receiving a new value for a build parameter in the public build parameter set;
determining a new value for one of the build parameters in the private build parameter set based on the new value for the build parameter in the public build parameter set; and
using the new value for the build parameter in the private build parameter set and the new value for the build parameter in the public build parameter set to print a part from the material in the holding area using the at least one component.

5. The 3D printer of claim 1 wherein the part is a test part designed to evaluate the performance of the material.

6. The 3D printer of claim 1 wherein the received values for the public build parameter set comprise a value for a layer height.

7. The 3D printer of claim 1 wherein the received values for the public build parameter set comprise a hardware specification.

8. The 3D printer of claim 1, wherein the 3D printing technology is selected from one of material extrusion, material jetting, vat photopolymerization, powder bed fusion, and directed energy deposition.

9. A method in a 3D printer comprising:
receiving values for a public build parameter set and receiving a category for a material wherein the category represents multiple different materials;
using the received category when properties of the material are unknown to select and retrieve items used to determine private build parameter values from the values for the public build parameter set, wherein different items are selected for different received categories;
determining values for a private build parameter set that vary based on the properties of the material, wherein the values for the private build parameter set are determined from the received public build parameter set values and the retrieved items and the parameters of the private build parameter set are different from the parameters of the public build parameter set used to determine the values for the private build parameter set; and
using the received public build parameter set values and the private build parameter set values to print a part from a material within the category.

10. The method of claim 9 further comprising storing the determined values for the private build parameter set within the 3D printer such that users of the 3D printer cannot access the determined values.

11. The method of claim 9 wherein the values for the private build parameter set are determined as part of a method for evaluating a performance of the material within the category.

12. The method of claim 11 wherein the determined values of the private build parameter set and the received value for the public build parameter set are used to layer-wise build a plurality of parts to evaluate the performance of the material.

13. The method of claim 12 further comprising:
receiving a new value for a build parameter in the public build parameter set;
determining a new value for a parameter in the private build parameter set based on the new value for the build parameter in the public build parameter set; and
rebuilding the part using the new value for the build parameter in the public build parameter set and the new value for the build parameter in the private build parameter set.

14. The method of claim 9 further comprising:
receiving the values for the public build parameter set comprises receiving a value for a public build parameter that is independent of the material used to build the part; and
wherein determining the value for a build parameter in the private build parameter set comprises using the received value for the public build parameter that is independent of the material used to build the part and the items retrieved based on the category for the material to determine the value for the build parameter in the private build parameter set.

15. The method of claim 14 wherein the value for the public build material that is independent of the material used to build the part comprises a hardware specification.

16. A method performed by a 3D printer, the method comprising:
receiving a value for a first parameter from a user of the 3D printer;
receiving a category for a material used by the 3D printer;
using the received category to select and retrieve an item when at least one property of the material is unknown, wherein a different item is selected for different received categories;
determining a value for a second parameter using the value for the first parameter and the retrieved item wherein the second parameter is different from the first parameter used to determine the value for the second parameter;

storing the value for the second parameter and the identity of the second parameter such that the user of the 3D printer cannot access the value for the second parameter or the identity of the second parameter; and printing a part from a material within the category using the value for the first parameter and the value for the second parameter.

17. The method of claim 16 wherein the value for the first parameter varies with a property of a material used by the 3D printer.

18. The method of claim 17 further comprising receiving a value for a third parameter from the user of the additive manufacturing machine, the value for the third parameter is independent of the material used by the 3D printer.

19. The method of claim 18 wherein the value for the third parameter comprises a value for a hardware specification.

20. The method of claim 16 further comprising building a plurality of parts using the value for the first parameter and the value for the second parameter.

21. The method of claim 20 further comprising;
after building the plurality of parts, receiving a different value for the first parameter and determining an updated value for the second parameter based on the different value for the first parameter; and
building a part using the different value for the first parameter and the updated value for the second parameter.

22. A 3D printer comprising:
a holding area holding material to be used to print a part;
at least one component for printing the part through layer-wise additive manufacturing;
a data storage device on which instructions are stored for generating build parameter values, the instructions including empirically derived data, relationships, and/or equations; and
a processor executing instructions stored on the data storage device to perform steps comprising:
receiving values for a set of build parameters that vary based on at least one of properties of the material, liquefier hardware, and slice height and receiving a category for the material wherein the category represents multiple different materials and the material in the holding area is within the category;
based on the received category of the material and when at least one property of the material is unknown, selecting instructions for generating build parameter values, wherein different instructions are selected for different received categories;
executing the selected instructions for generating the build parameter values to determine values for a set of additional build parameters that vary based on the properties of the material, wherein the values for the additional build parameters are determined from the received build parameter values and the received category and the set of additional build parameters contains build parameters that are different from build parameters associated with the received build parameter values used to determine the values for the set of additional build parameters; and
using the received build parameter values and the set of additional build parameter values to print the part using the at least one component.

* * * * *